Aug. 31, 1943.   G. S. SCHUNK   2,328,233
POWER DRIVE FOR BICYCLES
Filed April 26, 1941
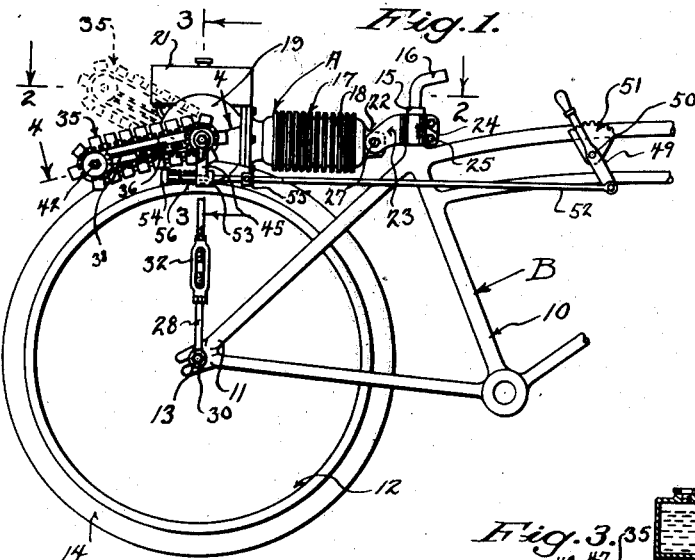
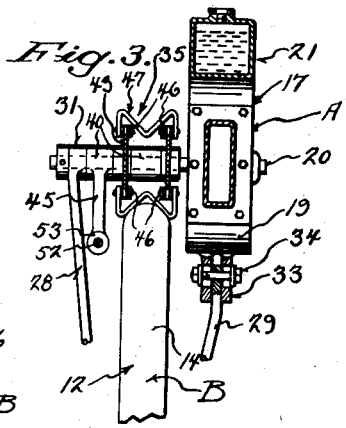
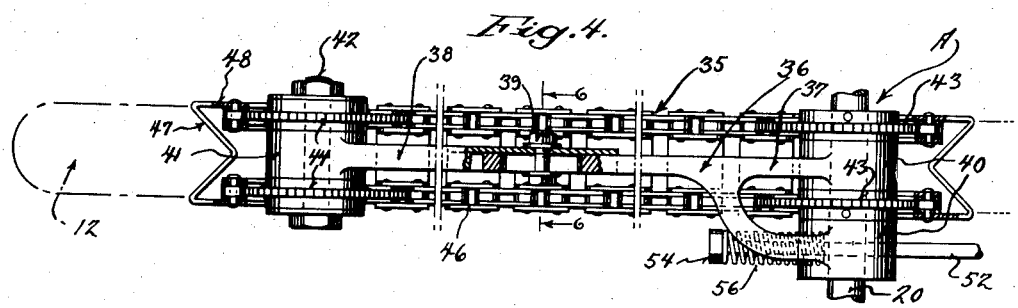
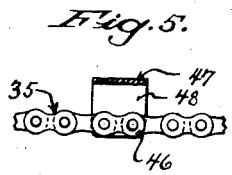
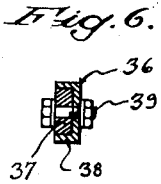
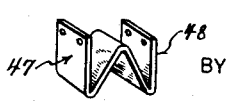
INVENTOR
George S. Schunk
BY
ATTORNEYS Patented Aug. 31, 1943

2,328,233

UNITED STATES PATENT OFFICE 2,328,233

POWER DRIVE FOR BICYCLES

George S. Schunk, West Allis, Wis.

Application April 26, 1941, Serial No. 390,604

3 Claims. (Cl. 180—33)

This invention appertains to vehicle propulsion, and more particularly to means for effectively driving small vehicles, such as bicycles, from a light internal combustion engine detachably mounted on the vehicle.

It has heretofore been proposed to provide a motor attachment for bicycles of the type commonly manufactured and sold in the open market (see my Patent No. 1,158,311, issued October 26, 1915).

In all devices of this character, with which I am familiar, great difficulty has been experienced in bringing about an effective drive between the internal combustion engine and the bicycle. In most instances, the engine is pivotally suspended from the bicycle frame and is provided with a drive pulley on its crankshaft for engaging a wheel of the bicycle. Hence, a great part of the weight of the engine is carried by the wheel, and the wheel soon becomes distorted and bent out of shape, due, probably, to the engine bouncing up and down on the wheel incident to the travel of the bicycle over an uneven street or highway. Where attempts have been made to relieve the wheel of the weight of the engine, a complicated and unsatisfactory drive has resulted.

Therefore, one of the primary objects of my invention is to provide means for mounting the engine wholly on the frame of the bicycle and to provide a novel power transmission mechanism, which can be readily moved into and out of driving engagement with one wheel of the bicycle.

Another salient object of my invention is to provide means for operating an endless track from the crankshaft of the engine and to rockably support the track from the engine, with a simple hand lever mechanism for moving the drive track into and out of driving engagement with the tire of one wheel of the bicycle, the drive track forming a relatively long driving contact with the tire.

A further important object of my invention is to provide means for resiliently maintaining the drive track in driving engagement with the wheel when the track is moved into its lowered operative driving position.

A still further object of my invention is to provide novel means for constructing the endless drive track itself, whereby to insure a desired driving engagement between the track and the wheel, and whereby lateral shifting of the track relative to the tire and wheel will be prevented.

A still further important object of my invention is to provide means for adjustably mounting the engine on the frame of the bicycle, whereby the position of the engine relative to the driven wheel of the bicycle can be initially set to suit the particular size and other characteristics of the bicycle with which the engine is associated.

With these and other objects in view, the invention consists in the novel construction, arrangement, and formation of parts, as will be hereinafter more specifically described, claimed, and illustrated in the accompanying drawing, in which drawing:

Figure 1 is a fragmentary, side, elevational view of a bicycle, showing my novel mechanism incorporated therewith.

Figure 2 is a horizontal sectional view taken on the line 2—2 of Figure 1, looking in the direction of the arrows.

Figure 3 is a transverse sectional view taken on the line 3—3 of Figure 1, looking in the direction of the arrows, illustrating the driving engagement between the endless track and a wheel of the bicycle.

Figure 4 is an enlarged, fragmentary, sectional view through the drive mechanism, taken on the line 4—4 of Figure 1, looking in the direction of the arrows.

Figure 5 is a fragmentary, detail, longitudinal, sectional view through a part of the endless track, illustrating the construction thereof.

Figure 6 is a detail, transverse, sectional view through the supporting frame for the endless track, the view being taken substantially on the line 6—6 of Figure 4.

Figure 7 is a detail perspective view of one of the tread plates of the endless track.

Referring to the drawing in detail, wherein similar reference characters designate corresponding parts throughout the several views, the letter A generally indicates my novel attachment for driving a bicycle B.

The bicycle B is of the usual type now commonly sold in the open market, and, hence, the same includes the frame 10 having a rear fork 11 for receiving the rear wheel 12. This wheel 12 is rotatably mounted in any preferred way on a rear axle 13 carried by the fork 11, and means can be provided for manually driving the rear wheel 12 in the usual or any preferred manner. A rubber tire 14 can be provided for the wheel 12. The frame 10 also includes the upstanding hollow socket 15 for receiving the post 16 for the operator's seat or saddle (not shown).

My attachment A includes a light internal combustion engine 17 of a portable type, and engines of this character can be purchased in the open market. The engine will not be described in detail, but it is to be noted that the same includes a cylinder 18 having a crankcase 19 through which extends the crankshaft 20. The fuel tank 21 and other necessary appliances can be carried by the crankcase and the cylinder. It is desirable, however, to cast a lug 22 on the head of the cylinder, whereby to provide means for facilitating the connection of the engine with the frame of the bicycle.

For connecting the engine to the bicycle, I utilize a supporting bracket 23, and this bracket preferably includes a split sleeve 24 for engaging about the tubular socket 15 for the seat post 16. Bolts 25 can be employed for tightening the split sleeve about the socket, and the bracket also includes an offset arm 26. This offset arm 26 extends to one side of the rear wheel 12 and terminates in a forked extension for receiving the lug 22 formed on the engine. A pivot bolt 27 is employed for hingedly connecting the lug 22 and the forked extension of the bracket together.

The engine is supported slightly above and to one side of the wheel 12 by supporting and brace rods 28 and 29 arranged on opposite sides of the wheel 12. The lower ends of these rods 28 and 29 are supported from the fork 11, and the lower ends of these rods preferably terminate in eyes 30 for receiving the ends of the axle 13. The eyes can be held on the axle ends against accidental displacement by the use of suitable lock nuts. The upper end of the rod 28 can terminate in a bearing 31 for receiving the end of the crankshaft 20, which extends over the bicycle wheel 12. This rod 28 also has preferably incorporated therein at a point intermediate its ends a turnbuckle structure 32, whereby the active length of the rod 28 can be adjusted. The upper end of the rod 29 is slidably fitted between slotted ears 33 carried by the engine crankshaft, and the rod 29 is secured in an adjusted position in the slotted ears by means of an adjusting bolt 34.

From the construction so far, it can be seen that the engine is securely carried by the frame of the bicycle, and that the rear end of the engine can be moved up and down by adjusting the length of the rod 28 and by loosening the bolt 34 and moving the rod up or down between the ears 33.

In accordance with my invention, I provide a novel drive transmission between the engine and the rear wheel 12, and this drive transmission includes an endless drive track 35 disposed above the wheel 12. In order to carry the endless track 35, I provide a supporting frame 36 therefor. This supporting frame 36 includes inner and outer sections 37 and 38 adjustably connected together by means of a bolt 39. The forward end of the frame section 37 carries spaced bearing sleeves 40 for rotatably receiving the crankshaft 20 of the engine. The outer end of the frame section 38 carries a bearing sleeve 41 for rotatably receiving a rear shaft 42 for the endless track. The crankshaft 20 of the engine has keyed or otherwise secured thereto spaced sprocket wheels 43, and similar spaced sprocket wheels 44 are mounted upon the rear shaft 42. The frame 36 has formed on its section 37 a depending operating arm or crank 45, the purpose of which will be hereinafter more fully set forth.

The endless drive track 35 includes a pair of spaced endless sprocket chains 46, and these sprocket chains are trained about the sprocket wheels 43 and 44. Transversely extending, equidistantly spaced tread plates 47 connect the sprocket chains 46 together for synchronous movement, and the sprocket chains 46 and the tread plates 47 form the endless drive track per se.

Particular attention is directed to the shape of the tread plates 47, as these tread plates form one important feature of my invention. As clearly illustrated in Figures 3 and 7, each tread plate 47 is of a V-shape in side elevation, the ends of the legs of the V having formed thereon inturned arms 48, which are secured to the links of the sprocket chains 46 by the rivets which are employed for connecting said links together.

As heretofore stated, the endless drive track is disposed above the rear wheel 12 of the bicycle, and when the drive track is in a lowered operative drive position, one run of the track is adapted to engage a part of the periphery of the rear wheel 12, and as the track is of a flexible nature, the lower run of the endless track will conform to the circumferential configuration of the wheel. As the body portions of the tread plates are of a V-shape, said body portions will straddle and engage the opposite sides of the tire, forming an effective driving engagement therewith, and as the body portions of the tread plate engage opposite sides of the bicycle tire, lateral shifting of the endless track is prevented.

It will also be noted at this time that as the complete lower run of the endless track engages the tire of the rear wheel, an effective drive will be had between the engine and said rear wheel. If desired, the active faces of the bodies of the tread plates can be provided with rubber or tread surfaces. By adjusting the sections 37 and 38 of the supporting frame 36 for the track, any slack in the track can be taken up, and, hence, the frame acts as a track tightener.

Means is provided for raising and lowering the endless track out of and into driving engagement with the tire of the rear wheel, and this means includes a hand lever 49. The hand lever 49 is rockably mounted intermediate its ends on a pivot pin 50 carried by a sector plate 51 rigidly secured to the frame 10 of the bicycle forwardly of the bicycle seat, and the lower end of this hand lever has pivotally connected thereto an operating rod 52. This operating rod 52 extends rearwardly of the bicycle and is slidably received in a guide sleeve 53 formed on the operating arm 45 of the supporting frame 36 for the endless track 35. The rod 52 on opposite sides of the guide sleeve 53 has connected therewith spaced stops 54 and 55. If desired, the stop 55 can be adjustably mounted on the rod 52. An expansion spring 56 is coiled about the rod 52 and is confined between the stop 54 and the guide sleeve 53. It is to be understood that the rod 52 is loosely fitted within said guide sleeve. The hand lever 49 can be held in any desired adjusted position by means of a latch dog (not shown), which is adapted to engage in the teeth of the sector plate 51.

The engine 17 functions in the usual way, and after the engine has been started, driving connection between the crankshaft 20 of the engine and the wheel 12 is had by swinging the upper end of the hand lever 49 rearwardly. This will pull the operating arm 45 forwardly, contracting the coil spring 56. The forward rocking movement of the arm 45 will swing the supporting frame 36 down on the crankshaft 20 and bring the endless drive track 35 into firm contact with the periphery of the tire 14 of the rear wheel 12. The spring 56 functions to resiliently maintain the proper driving connection between the endless track and the tire. As the hand lever is latched in this adjusted position, movement of the rod is prevented.

When it is desired to move the endless track out of driving contact with the tire, the upper end of the hand lever 49 is swung forwardly, and the stop 55 will engage the sleeve 53 and will push back on the lower end of the arm 45, moving the track to an elevated position, as is clearly shown in dotted lines in Figure 1. Upon the latching of the lever 49 in this adjusted position, the endless track will be held out of its driving operative position.

From the foregoing description it can be seen that I have provided an exceptionally simple and efficient means for driving a bicycle from an internal combustion engine in such a manner that the weight of the engine is not carried by the periphery of the driven wheel.

Changes in details may be made without departing from the spirit or the scope of my invention, but what I claim as new is:

1. In a bicycle including a frame and a wheel an internal combustion engine rigidly mounted upon the frame including a crankshaft extending over the wheel, a supporting frame rockably mounted upon the crankshaft and extending outwardly therefrom and movable independently of the engine, a shaft carried by the outer end of the supporting frame, sprocket wheels on the shaft at the outer end of the supporting frame and on the crankshaft, an endless track including sprocket chains trained about said sprocket wheels disposed above the bicycle wheel for driving engagement therewith, an operating arm carried by the inner end of the supporting frame, and manual means for actuating said arm.

2. In a bicycle including a frame and a wheel, an internal combustion engine rigidly mounted upon the frame including a crankshaft extending over the wheel, a supporting frame rockably mounted upon the crankshaft and extending outwardly therefrom, a shaft carried by the outer end of the supporting frame, sprocket wheels on the shaft at the outer end of the supporting frame and on the crankshaft, an endless track including sprocket chains trained about said sprocket wheels and disposed above the bicycle wheel for driving engagement therewith, an operating arm carried by the inner end of the supporting frame, and manual means for actuating said arm, said means including a hand lever, a rod pivotally secured to the hand lever loosely extending through the arm, spaced stops on the rod arranged on opposite sides of the arm, and an expansion spring coiled about said rod confined between one of the stops and the arm.

3. In a bicycle including a frame and a wheel, an internal combustion engine rigidly mounted upon the frame including a crankshaft extending over the wheel, a supporting frame rockably mounted upon the crankshaft and extending outwardly therefrom, a shaft carried by the outer end of the supporting frame, sprocket wheels on the shaft at the outer end of the supporting frame and on the crankshaft, an endless track including sprocket chains trained about said sprocket wheels disposed above the bicycle wheel for driving engagement therewith, an operating arm carried by the inner end of the supporting frame, manual means for actuating said arm, and means for adjusting the active length of the supporting frame for taking up slack in said track.

GEORGE S. SCHUNK.